United States Patent [19]

Reist et al.

[11] 4,265,437
[45] May 5, 1981

[54] METHOD AND APPARATUS FOR FOLDING MULTI-SHEET PAPER PRODUCTS, ESPECIALLY FOR THE FURTHER LONGITUDINAL FOLDING OF NEWSPAPERS HAVING A TRANSVERSE BREAK

[75] Inventors: Walter Reist; Werner Glatz, both of Hinwil, Switzerland

[73] Assignee: Ferag AG, Hinwil, Switzerland

[21] Appl. No.: 949,503

[22] Filed: Oct. 10, 1978

[30] Foreign Application Priority Data

Oct. 24, 1977 [CH] Switzerland ............... 12896/77

[51] Int. Cl.³ .................... B65H 45/00; B65H 45/22
[52] U.S. Cl. ................................................ 493/435
[58] Field of Search .............. 270/61 R, 62, 21, 32, 270/66, 41, 86, 94; 93/84 R; 83/883–887

[56] References Cited

U.S. PATENT DOCUMENTS

| | | | |
|---|---|---|---|
| 1,186,970 | 6/1916 | Cottrell | 270/41 |
| 3,632,103 | 1/1972 | Nikitits | 270/67 |
| 3,931,963 | 1/1976 | Bewersdorf | 270/86 |
| 4,189,134 | 2/1980 | Mills | 270/86 |

Primary Examiner—Edgar S. Burr
Assistant Examiner—A. Heinz
Attorney, Agent, or Firm—Werner W. Kleeman

[57] ABSTRACT

A method and apparatus for folding multi-sheet paper products, especially for forming a further longitudinal fold at newspapers having a transverse break. During the formation of the fold or shortly before there is produced a bend in the sheets to be folded, whose curvature is opposite to the curvature of the fold to be formed. In this way there are avoided ray-like extending crease folds in the innermost sheets of the folded product. The apparatus for performing the method contemplates providing a folding element having at least one pair of folding edges which extend in the same direction at their effective region and are laterally spaced from one another, so that there is left free an intermediate space into which there can be displaced the innermost sheets of the product to be folded during the folding operation. The folding edges can be formed at the circumference of rotating, preferably coaxial folding disks, which coact with a smooth or profiled counter disk.

17 Claims, 14 Drawing Figures

METHOD AND APPARATUS FOR FOLDING MULTI-SHEET PAPER PRODUCTS, ESPECIALLY FOR THE FURTHER LONGITUDINAL FOLDING OF NEWSPAPERS HAVING A TRANSVERSE BREAK

BACKGROUND OF THE INVENTION

The present invention relates to a new and improved method of folding multi-sheet paper products, especially for applying a further longitudinal fold to paper products in the form of newspapers having a transverse break, and further, the invention pertains to novel apparatus for the performance of the aforementioned method.

During the folding of multi-sheet paper products phenomena arise with increasing thickness of such products, which at least are disturbing, when the paper product is again opened. These phenomena are attributed to the fact that theoretically it is only the innermost situated sheet of the fold which is to be formed which in the strictest sense really is "folded," whereas the remaining sheets so-to-speak are more or less "bent" about the "fold" of each next inner sheet. Therefore, during the folding operation the sheets of the paper products, which are comparable to the layers or plies of a layered product, must be capable of displacement relative to one another. Yet, particularly when forming the folds by automatic folding machines, this possibility of achieving such displacement is not always ensured, particulary in those cases where there is already formed in the paper product a pre-fold extending transversely with respect to the fold to be formed. If, however, during the course of the folding operation there is not possible such displacement of the sheets relative to one another, then the spine of the fold tends to so-to-speak "split," i.e., the outermost sheet or sheets of the fold tear or, however, there occurs an undesired creasing of the innermost sheets. To understand this more fully, reference at this point will be made to FIGS. 1, 2a, 3a, where the foregoing shall be explained in detail in conjunction with the folding of a newspaper.

Figures 1, 2A, 2B, 3A, 3B:
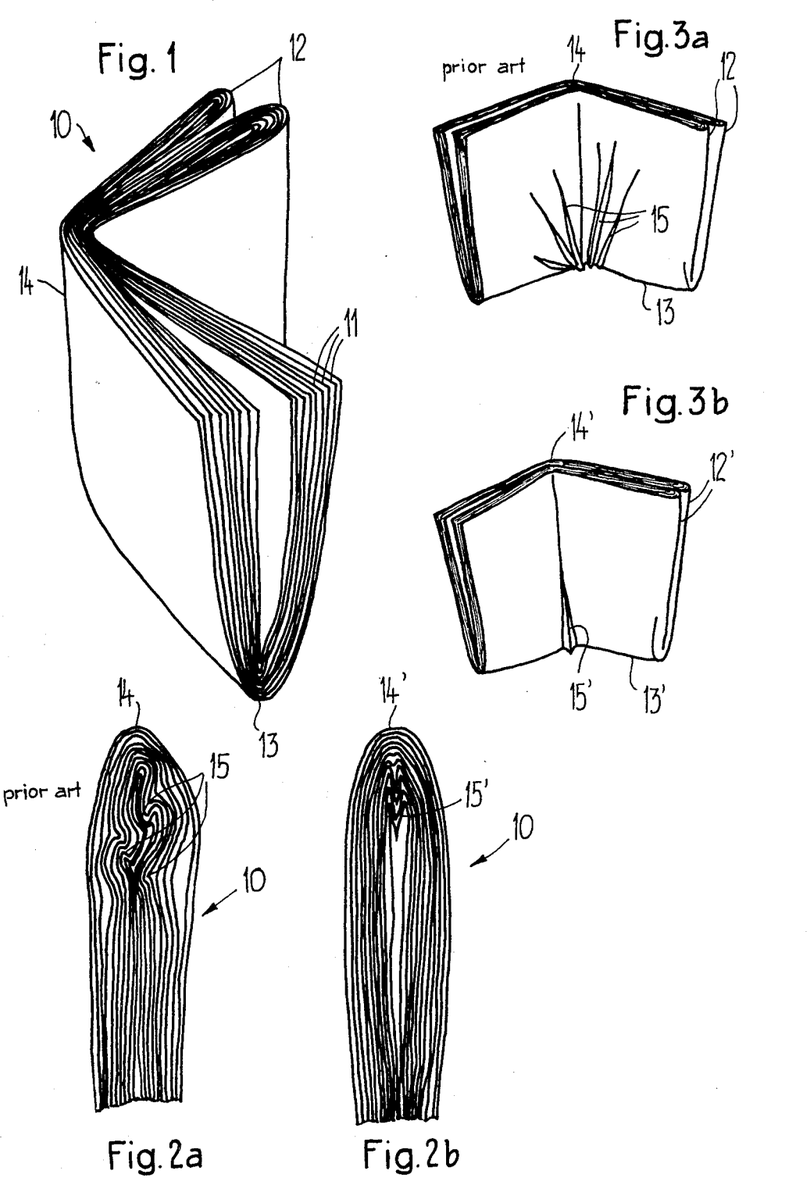
Figure 4:
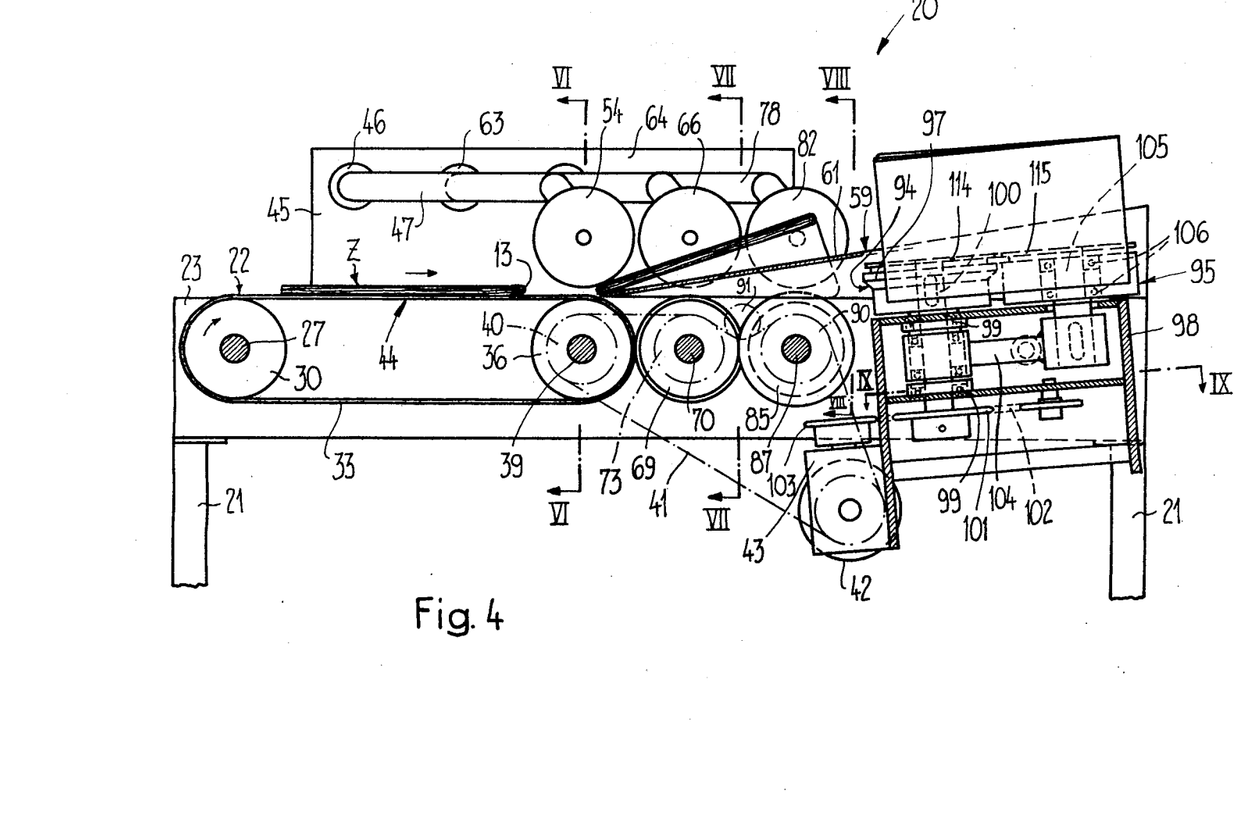
FIG. 4 is a longitudinal sectional view through an exemplary embodiment of an apparatus for folding newspapers in accordance with the method of the invention, the sectional view being taken substantially along the line IV—IV of FIG. 5.
Figure 5:
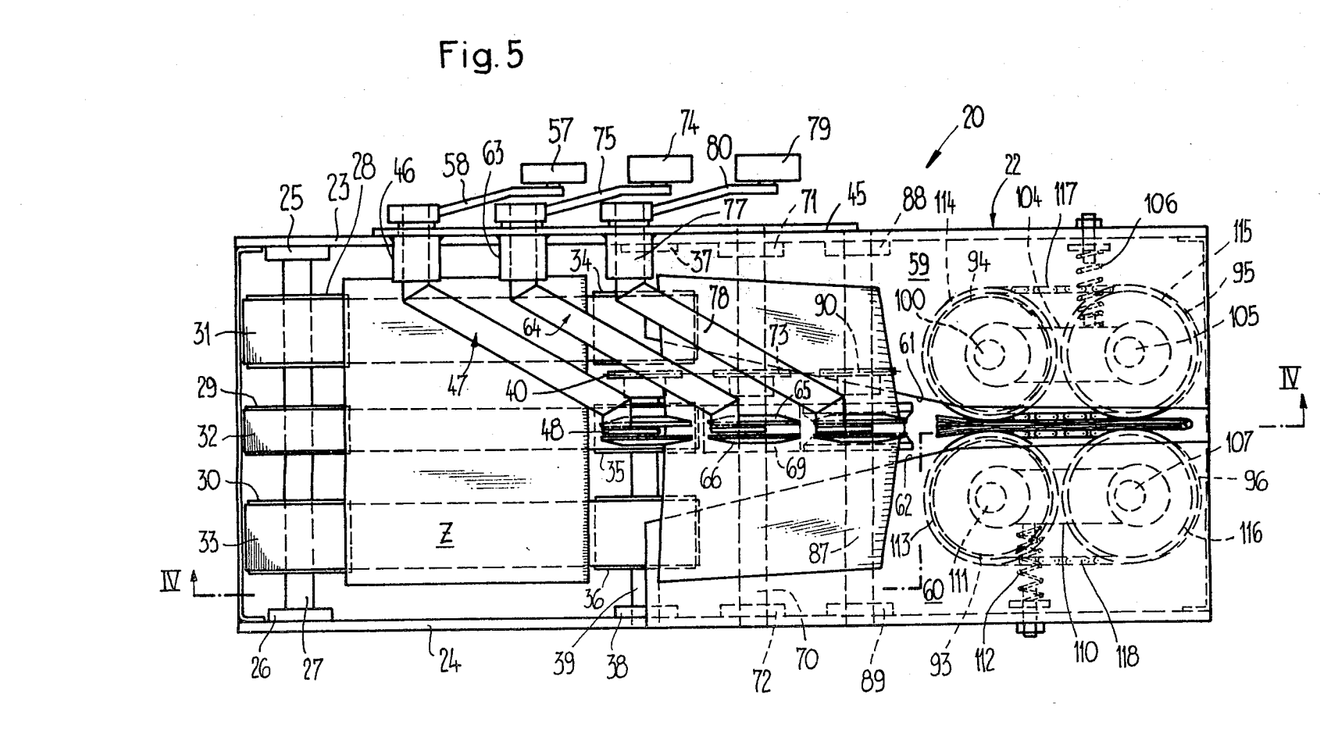
FIG. 5 is a top plan view of the apparatus of FIG. 4.
Figure 6:
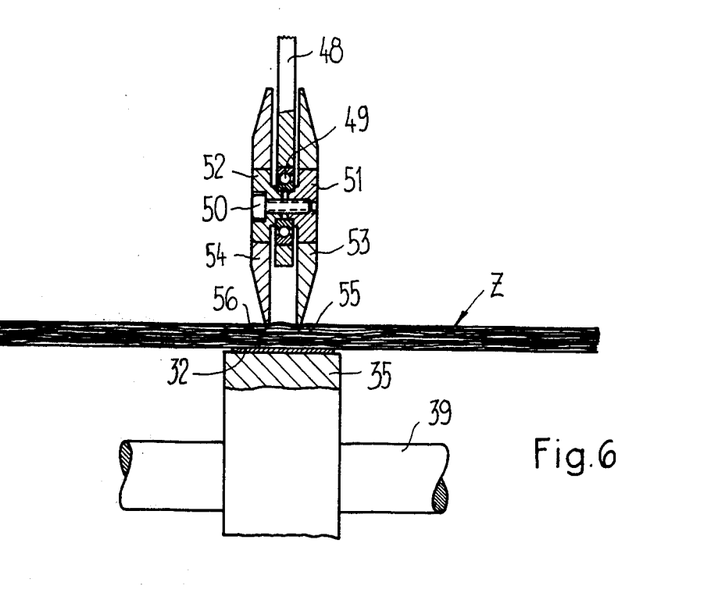
FIG. 6 is a simplified sectional view along the line VI—VI of FIG. 4.

Now in FIG. 1 there is shown a newspaper 10 composed of a number of sheets 11 which have been thrice commonly folded. The first performed fold, referred to in the art as the "first longitudinal fold," has been designated in the drawing by reference character 12 and the next subsequent fold which is formed, designated in the art as the "transverse break," is designated by reference character 13. If the newspaper is again folded and, specifically, transverse to the transverse break 13, then there is formed a second longitudinal fold, or, as it is referred to the so-called "post office fold" or briefly "post fold" 14. This expression "post office fold" is predicated on the fact that certain postal authorities refuse to handle single copies if they are in a shape of format resulting from the transverse break 13. FIGS. 1 and 3a illustrate the newspaper in a position where it is halfways open about such post fold 14. When producing the post fold or post office fold 14 there is not possible a relative displacement of the sheets 11 with respect to one another owing to the presence of the transverse break 13 and also the first longitudinal fold 12. As a result the sheets located innermost at the post fold 14 are creased. This can be clearly recognized by referring to FIG. 2a where there is shown a photographic section through the newspaper 10 with closed post fold 14 at the region of the transverse break 13. Now if the newspaper of FIG. 2a is opened then such creases appear in the form of ray-like crease folds 15 which emanate from the intersection point of the post fold 14 with the transverse break 13. These crease folds 15 are disturbing and can retard the readability of the printed text appearing at the innermost sheets near the post fold 14. This becomes even more disturbing since at the sheet innermost with respect to the post fold 14 there also is printed the title sheet or the final sheet of the newspaper, and these, as is well known, have particular significance in promoting the sale of the newspaper and attracting the attention of a potential reader.

Now in order to avoid these crease folds, German Pat. No. 931,656 has already proposed perforating the sheets at the location of the second longitudinal fold and then, after producing the transverse break, but prior to producing the second longitudinal fold, separating these sheets along the perforations. However, when doing so there appears at the centre of each sheet a slot, which is just as, if not more, disturbing than the aforementioned crease folds.

SUMMARY OF THE INVENTION

Therefore, with the foregoing in mind it is a primary object of the present invention to provide an improved method of, and apparatus for, folding multi-sheet articles in a manner not associated with the aforementioned drawbacks and limitations of the prior art proposals.

Another and more specific object of the present inventionn aims at the provision of a new and improved method of, and apparatus for, folding paper products, and wherein specifically it is possible to fold paper products having even considerably more than one hundred sheets, without producing the unorderly crease folds at the innermost sheets.

In order to further understand the invention there has been shown in FIG. 2b a sectional view, analogous to the showing of FIG. 2a, however of a newspaper 10' folded according to the invention, and in FIG. 3b this newspaper is shown half open at the post fold 14'. It will be observed that at the region of the post fold 14' part of the sheets which are located at the inside of the fold 14' have one and only one bend 15' which can be referred to as a "counter fold." This "counter fold" or bend 15' takes-up the region of such sheets which are prevented from carrying out a relative displacement or shifting. With the newspaper opened this "counter fold" appears in the form of a tapered pleated fold, as clearly evident by referring to FIG. 3b. This result is obtained by the practice of the proposed method of the invention. With the proposed method the sheets dispositioned to both sides of the fold which is to be produced are conjointly pivoted towards one another, wherein, as contemplated by the invention, at the region of the fold to be produced, a bend is formed at a multiplicity of the sheets located at the inside of such fold, this bend having a curvature which is opposite to the curvature of the fold to be produced.

To perform the method the invention proposes an apparatus having at least one folding element which is effective at the inside of the fold to be produced. This apparatus is manifested by the features that the folding element has a pair of folding edges which are directed in the same sense at their effective region and are arranged laterally spaced from one another. Thus, during the course of production of the fold the multiplicity of the sheets located at such region and at the inside thereof can move into the intermediate space between both of the fold edges, i.e., there is formed the bend curved opposite to the fold.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 1, 2a, 12b, 3a and 3b as already described, comparatively illustrate a newspaper folded in accordance with conventional techniques and a newspaper folded according to the method of the present invention;

DETAILED DESCRIPTION OF THE PREFERRED EMBODIMENT

Based upon the discussion of FIGS. 1, 2a, 2b, 3a and 3b as previously made herein, there will now be described the apparatus for performing the folding method of the invention, initially reference being made to FIGS. 4 to 8 inclusive. With the apparatus 20 shown in FIGS. 4 and 5 there will be recognized that a machine frame 22 having two side walls 23 and 24 is supported upon the support members or legs 21. Three rollers or rolls 28, 29 and 30 are seated upon a shaft 27 which extends between and is rotatively mounted at the side walls 23 and 24 at locations 25 and 26, respectively. Trained about each of these rolls or rollers 28, 29 and 30, which have practically the same diameter, is a flat belt 31, 32 and 33, respectively. These flat belts 31, 32 and 33 lead to rollers or rolls 34, 35 and 36 respectively, which are seated for rotation at a rotatably mounted shaft 39 which likewise extends between the side walls 23 and 24 and is rotatably secured thereat at the locations 37 and 38 respectively. There is additionally seated upon shaft 39 a sprocket wheel 40 which is operatively coupled by means of a chain 41 with a drive motor 42 with which there is flanged miter or bevel gearing 43. The elements 28 to 36 thus form a belt conveyor 44 which serves the purpose of infeeding the incoming paper products, here the newspapers Z with a leading transverse break 13, to the folding operations.

At a part 45 of the side wall 23 which protrudes past the side wall 24, there is freely rotatably mounted in a bearing support or bearing means 46 a flexed arm 47. This flexed arm 47 extends away from the bearing support 46 essentially horizontally and at an inclination towards the roll 35. At the end of the arm 47 which is remote from the bearing support 46, there is secured a downwardly directed flat iron element or member 48 and at this downwardly depending member 48 there is freely rotatably mounted a contact element. The contact element can have the shape of a contact roll, since its function resides in pressing the incoming newspapers Z against the belt or band 32, and thus, ensuring that the newspapers will be further displaced until their trailing edge departs from the band or belt conveyor 44. In the embodiment under discussion, however, for the sake of simplicity the contact element is constructed the same as the subsequently arranged and still to be described fold discs or plates. A ball bearing 49 is embedded in the flat iron member 48, as best seen by referring to FIG. 6. At the ball bearing 49 there are mounted two hub elements or parts 51 and 52 which are threaded together in axial direction by means of a bolt 50 or equivalent structure. Drawn over the circumference of each of the hub elements 51 and 52 is a respective ring-shaped or annular disc 53 and 54, the thickness of which decreases towards the outer circumference, so that such only bear at the newspaper with a comparatively narrow circumferential edge 55 and 56, respectively. At the part of the arm 47 which extends through the bearing support 46 there is attached a further arm 58 provided with a weight 57. Apart from the inherent weight of the arms 47 and 58, the weight 57 thus determines the contact force exerted by the discs 53 and 54 upon the newspaper Z. This contact force, as will be readily understood, is to be accommodated to the paper products which are infed to the apparatus. Therefore, the weight 57 can be removed by any suitable and thus, not particularly shown means and can be exchanged for a different weight which is then secured to the arm 58.

Following the band or belt conveyor 44 there is attached a guide plate or member 59 and 60, for instance a sheet metal guide plate, at each side wall 23 and 24. The edges of these guide members 59 and 60 which are situated opposite the side walls 23 and 24, as best seen by referring to FIGS. 7, 7a and 8, can be downwardly bevelled and form a respective guide edge 61 and 62 which, viewed in the direction of through passage, initially converge towards one another (at the centre of the showing of FIG. 5) and then extend parallel to one another (according to the right-hand portion of FIG. 5) and ascend over their entire length (reference being made to FIG. 4).

There is freely pivotably mounted a further flexed or bent arm 64 in a bearing support 63 in the elevated part 45. This arm 64 is constructed and shaped in the same manner as the arm or arm member 47. At the end of the arm 64 which is remote from the bearing support 63 there are likewise mounted to be freely rotatable two coaxial discs or plates 65 and 66 in spaced relationship from one another. The construction and shape of the discs 65 and 66 corresponds to that of the discs 53 and 54 discussed previously in conjunction with FIG. 6. As best seen by referring to FIGS. 7 and 7a, the circumferential edges 67 and 68 of these two discs 65 and 66 roll upon the forwardly advanced newspaper Z, while exerting a pressing or contact force, this newspaper being supported at the opposite side upon a counter roll or roller 69. This contact force emanates from an arm 75 provided with a weight 74 and connected with the arm 64. The counter roll 69 is seated upon a shaft 70 arranged parallel to the shaft 39 and at the same elevation. This shaft 70 is rotatably mounted in the side walls 23 and 24 at locations 71 and 72, respectively, and additionally, carries a sprocket wheel 73 meshing with the chain 41, as best seen by referring to FIG. 4.

Figure 7:
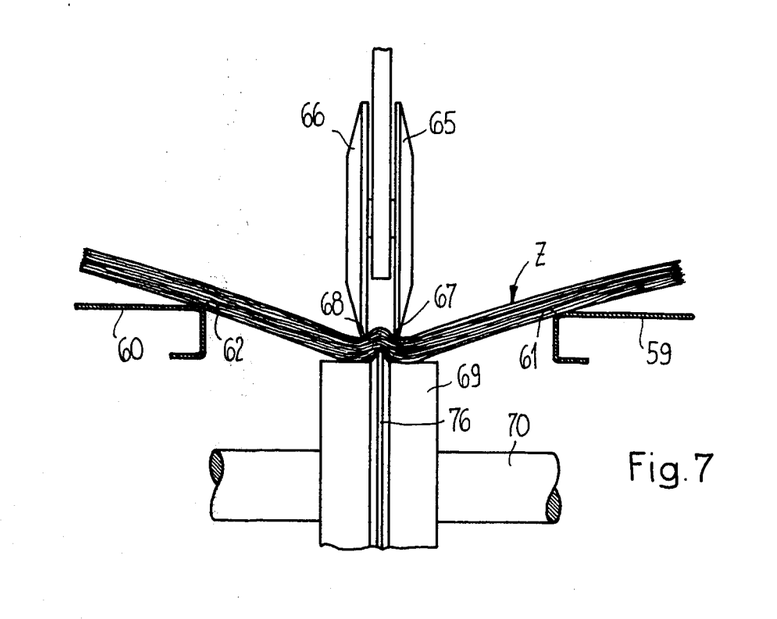
FIGS. 7 and 8 are simplified views of the arrangement of FIG. 4, respectively taken along the line VII—VII and line VIII—VIII thereof.
Figure 7A:
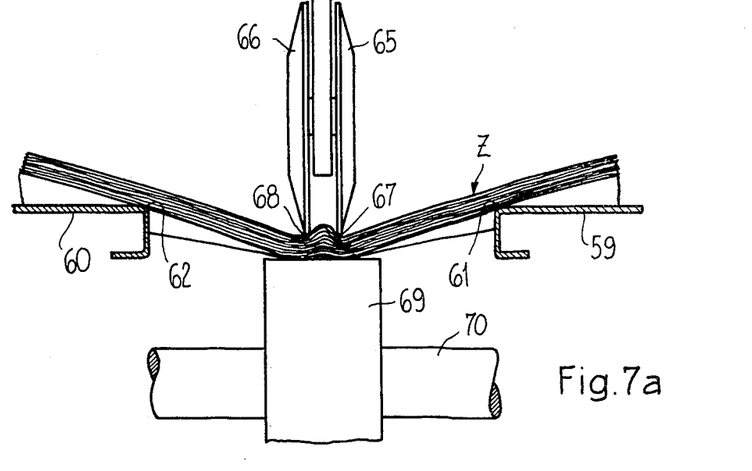
FIG. 7a illustrates a modified embodiment of the arrangement of FIG. 7.

The newspaper Z is not only positively forwardly advanced at the location of the discs or plates 65 and 66, due to the drive of the roller 69 into the gap between such discs and by the action of the circumferential edges 66 and 67, but also, as best seen by referring to FIGS. 7 and 7a, is somewhat raised to both sides of the discs 65 and 66 due to the ascending guide edges 61 and 62. As a result the region of the sheets of the newspaper Z, located between the discs 65 and 66 and which sheets are situated closest to such region, tend to bow out upwardly and therefore, there is now achieved a prestage of the counter fold 15' discussed previously in conjunction with FIGS. 2b and 3b. This upward bulging or bowing out can be augmented, particularly in the case of extremely thick paper products and/or those whose sheets have low sliding properties in that, as shown in FIG. 7, the counter roll 69 is provided with a collar 76 extending about its outer surface. This collar 76 is aligned with the intermediate space between the discs 65 and 66.

Furthermore, in a bearing support 77 provided at the part 45 there is yet pivotably mounted a further arm or arm member 78 which is constructed analogous to the arms or arm members 47 and 64, and connected with an arm or arm member 80 carrying a weight 79. At the end of the arm 78 remote from the bearing support 77 there are freely rotatably mounted, in spaced relationship from one another, two coaxial discs or plates 81 and 82. The construction and form of these discs 81 and 82 likewise correspond to the discs 53 and 54 previously described in conjunction with FIG. 4. The circumferential edges 83 and 84 of the discs 81 and 82 roll, while exerting a contact force depending upon the size of the weight 79, upon the further forwardly advanced newspaper Z which has been moved from the conveying gap between the counter roll 69 and the circumferential edges 67 and 68. This newspaper Z is supported upon a shaped or profiled roll or roller 85 located at the oppositely situated side. The profiled roll 85 is provided at its circumference or periphery with a folding groove 86 and is seated upon a shaft 87, which, in turn, analogous to the shafts 39 and 70, is rotatably mounted at locations 88 and 89 at the side walls 23 and 24, respectively. Also seated upon the shaft 87 is a sprocket wheel 90 which meshes with the chain 41 which is held in a tensioned state by means of a tensioning wheel 91. The circumferential edges 83 and 84 here act in conjunction with the folding or fold groove 86 and with the guide edges 61 and 62 which are located higher and closer to one another at the region of the discs 81 and 82, as the actual folding edges which initiate folding of the newspaper Z transversely with respect to the leading fold or transverse break 13.

Figure 8:
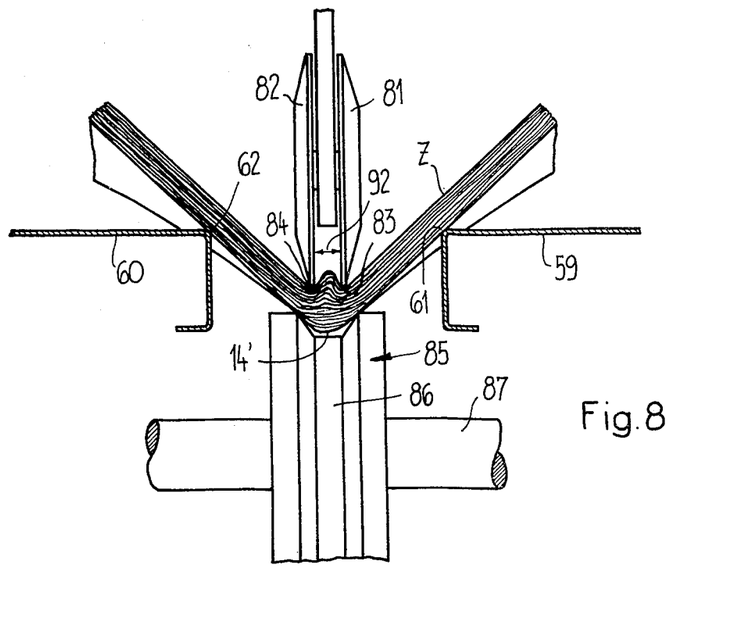
Figure 9:
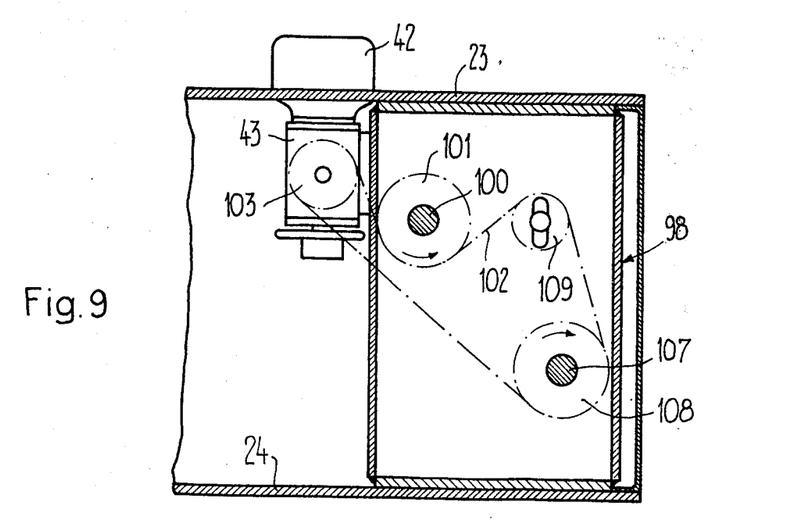
FIG. 9 is a schematic sectional view taken along the line IX—IX of FIG. 4.

Now since the fold edges 83 and 84 have a spacing from one another, i.e., there is left free therebetween an intermediate space 92, the region of the sheets of the newspaper Z located between the discs or plates 81 and 82 and closest to such region, experience an upward bowing-out, as shown in FIG. 8. Additionally, the driven profiled roll 85 in conjunction with the discs 81 and 82 also functions as a further feed or advancing element which further forwardly displaces the newspapers Z, which thus are gradually closed due to the ascending and mutually converging guide edges 61 and 62. Following the profiled roll 85 of the paired discs 81 and 82, at the region where the guide edges 61 and 62 practically extend in parallelism with respect to one another, are two pairs of practically vertical axis-press or contact drums or rolls 93, 94 and 95 and 96. The contact drums or rolls 93, 94 possess a comparatively narrow contact rim 97, as best seen by referring to FIG. 4, whereas the contact or press drums 95 and 96 are cylindrical. As also best seen by referring to FIG. 4, the contact roll or drum 94 is keyed or otherwise appropriately connected to the upper end of a shaft 100 mounted in ball bearings 99 in a bearing box 98 between the side walls 24 and 25. In this connection, attention is also directed to FIG. 9. At the lower end of the shaft 100 there is pinned thereto a sprocket wheel 101 which meshes with a chain 102, this chain, in turn, being guided about a drive wheel or gear 103 which is arranged at the miter or bevel gearing 43 flanged to the drive motor 42 (see FIG. 9). Between both ball bearings 99 there is mounted a rocker or balance 104 which is pivotable about the shaft 100. At the free end of the rocker or balance 104 there is clamped a shaft 105 extending essentially parallel to the shaft 100. Ball bearings 106 rotatably mount the contact or press drum or roll 95 upon the shaft 105. From the showing of FIG. 5 it will be apparent that a compression spring 106, supported at the inside of the side wall 23, acts upon the rocker or balance 104, so that the contact drum or roll 95 is resiliently pre-biased towards the contact or press roll or drum 96. The contact drum 96, on the other hand, similar to the contact or press drum 94, is keyed to a shaft 107 which is stationarily and rotatably mounted in the bearing box 96, as best seen by referring to FIG. 9. Seated upon shaft 107 is a sprocket wheel 108 which, in turn, likewise meshes with the chain 102 which is held in a tensioned state by the tension wheel 109. Pivotably mounted upon the shaft 107 is likewise a rocker or balance 110 at whose end there is clamped a shaft 111 upon which there is rotatably mounted the contact or press drum 93. The rocker or balance 110 is exposed to the action of a pressure or compression spring 112 (FIG. 5) supported at the side wall 24, whereby the contact or press drum 93 is resiliently urged towards the contact or press drum 94.

In order to ensure that all of the contact drums or rolls 93 to 96 positively rotate with the same peripheral speed, there is flanged to the upper end face or side of each of the contact drums a respective sprocket wheel 113, 114, 115 and 116. The sprocket wheel 114 arranged at the directly driven contact drum 94 is connected by means of a chain 117 with the sprocket wheel 115 at the resiliently biased contact drum 95. The sprocket wheel 116 arranged at the directly driven contact drum or roll 96 is connected by means of a chain 118 with the sprocket wheel 113 at the resiliently biased contact or press drum 93. Apart from the further conveying of the upright newspapers Z which stand at the produced fold, the contact drums 93 and 94 exert, by means of their contact or press rims 97, a compressing or pressing action at the newspaper at the region of, however not quite at the produced fold, whereas the contact drums 95 and 96, owing to their cylindrical outer surface, definitely press the produced fold 14' together with the counter folds 15' formed at the inside thereof, so that the newspaper, after departing from the apparatus 20, constitutes a stable, practically quadrilateral or square structure which does not have any great tendency to open.

It has been found that with the described apparatus 20 newspapers having considerably more than one hundred pages, i.e., with considerably more than fifty sheets, can be readily faultlessly folded a third time and without the risk of forming an over-stressed or even torn fold spine. The result of this corresponds to a common folding of well over one hundred superimposed paper layers or plies.

Figure 10:
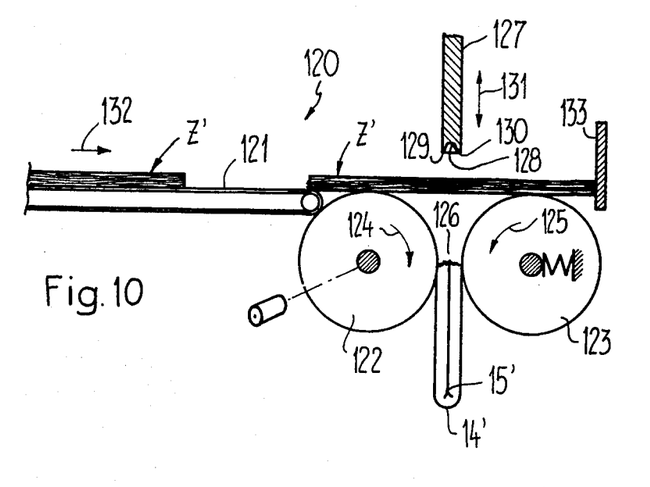
FIGS. 10 and 10a are schematic illustrations of a variant embodiment of apparatus.
Figure 10A:
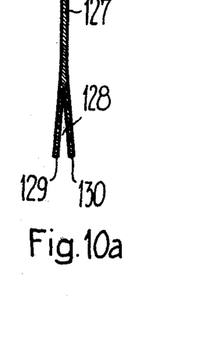

Finally, in FIGS. 10 and 10a there is shown a simpler constructional embodiment of the apparatus in schematic view, serving for folding less thick paper products. This apparatus 120, in principle, operates like a sword folding apparatus. Following a conveyor band or belt 121 there is arranged a pair of contact rolls or drums 122 and 123. At least one of the contact rolls or drums 122 and 123 is driven, in FIG. 10 it is the contact drum 122, so that such can rotate in the direction of the arrows 124 and 125. Equally one of the contact drums 122 or 123 is resiliently biased towards the other contact drum. Between both of the contact drums or rolls 122 and 123 there is present a fold or folding gap 126. A folding sword 127 having two folding edges 129 and 130 extending parallel to the axes of the contact drums or rolls 122 and 123 and spaced from one another by an intermediate space or a channel or throat 128 is aligned towards the folding gap 126 and driven up and down, by any suitable and therefore not particularly illustrated drive in the direction of the double-headed arrow 131. The conveyor belt or band 121 transports the paper products Z' which are to be folded in the direction of the arrow 132 over the contact drums or rolls 122 and 123 until the paper products strike against a stop or impact member 133. Now the folding sword 127 performs a work stroke in the direction of the folding gap 126. Since both folding edges 129 and 130 leave a space therebetween, the sheets of the paper product which neighbour the folding edges 129 and 130 are caused to bend into such space, so that as shown in FIG. 10, there also is formed within the fold 14' the counter fold 15'.

FIG. 10a shows a variant of the folding sword 127. This modified construction of the folding sword 127 will be seen to have a sectional shape in the form of approximately a fork or bifurcated member.

While there are shown and described present preferred embodiments of the invention, it is to be distinctly understood that the invention is not limited thereto, but may be otherwise variously embodied and practiced within the scope of the following claims. Accordingly,

What we claim is:

1. A method of folding individual multisheet paper products along a folding line, particularly for applying a further longitudinal fold to newspapers having an existing fold running transversely to said fold line, comprising the steps of:
    applying pressure along two distinct parallel lines located on opposite sides of said folding line to that side of the paper product forming the inside of the fold to be formed;
    moving the paper products in a predetermined direction during the pressure application to induce between said two parallel lines a bend in a portion of the sheets located at the inside of the fold to be formed;
    said bend having a curvature opposite to the curvature of the fold to be formed; and
    initiating the folding of the paper product along the folding line while said bend is still present.

2. An apparatus for folding individual multi-sheet products along a folding line, particularly for applying a further longitudinal fold to newspapers having an existing fold running transversely to said fold line, comprising:
    at least one pressure element having two spaced parallel pressure edges for applying pressure along two distinct parallel lines located on opposite sides of said folding line to that side of the paper product forming the inside of the fold to be formed;
    fold means located adjacent said pressure element to form said fold; and
    means for moving the paper products into engagement and past said pressure element and said fold means.

3. An apparatus for folding individual multi-sheet products along a folding line, particularly for applying a further longitudinal fold to newspapers having a transverse break, comprising:
    at least one pressure element having two spaced parallel pressure edges for applying a pressure along two parallel lines located on opposite sides of said folding line to that side of the paper product forming the inside of the fold to be formed;
    means located adjacent said pressure element to form said fold;
    said pressure element including two rotatable folding disks each having a peripheral portion;
    each pressure edge being formed at the peripheral portion of a related one of said two rotatable folding disks; and
    a counter disk cooperating with said two rotatable folding disks for forming therebetween a folding and conveying gap.

4. The apparatus as defined in claim 3, further including:
    means for coaxially mounting said folding disks.

5. The apparatus as defined in claim 4, wherein:
    said mounting means includes means for mounting said folding disks and counter disk so as to be axially parallel to one another.

6. The apparatus as defined in claim 3, further including:
    folding disks being freely rotatably mounted;
    means for pre-biasing said freely rotatably mounted folding disks towards said counter disk; and
    means for driving said counter disk.

7. The apparatus as defined in claim 3, wherein:
    said counter disk is substantially cylindrical.

8. The apparatus as defined in claim 3, further including:
    a plurality of pairs of said folding disks arranged in succession;
    the pressure edge of the one folding disk and the folding edge of the other folding disk of each pair each being located in a respective plane.

9. The apparatus as defined in claim 8, wherein:
    said planes defined by said pressure edges of the one folding disk and said pressure edges of the other folding disk of each pair are essentially parallel to one another.

10. The apparatus as defined in claim 8, further including:
    means provided to both sides of the pairs of folding disks in order to pivot the sheets passing to both sides of the fold to be formed at the region of the folding disks towards one another.

11. The apparatus as defined in claim 10, wherein:

said means comprise guide edges which have a converging course viewed in the direction of travel of the products.

12. The apparatus as defined in claim 8, further including:
at least one pair of contact rolls arranged following the last pair of folding disks, viewed in the direction of conveying of the printed products.

13. An apparatus for folding individual multi-sheet products along a folding line, particularly for applying a further longitudinal fold to newspapers having a transverse break, comprising:
plural pressure elements effective at the inside of the fold to be formed;
each of said pressure elements having a pair of substantially linear and parallel pressure edges;
each of said pressure elements comprising:
two freely rotatable folding disks, each having a peripheral portion;
each pressure edge being formed at said peripheral portion of a related one of said two rotatable disks, said plural pressure elements being arranged in succession;
plural counter disks, each cooperating with respective two of said rotatable folding disks for forming therebetween a folding and conveying gap;
means biasing said freely rotatable folding disks towards the related counter disk;
means driving said counter disks;
said counter disk of the last pair of folding disks, viewed in the direction of conveying of the products, possessing a groove extending about its outer surface; and
said last pair of folding disks, pressing by means of their pressure edges, that section of the paper product into said groove which is located at the region of the fold to be formed.

14. The apparatus as defined in claim 13, wherein:
the counter disk of the next to last pair of folding disks possesses a collar extending about its outer surface;
said collar forcing the paper product at the region of the fold to be formed between the related folding disks.

15. An apparatus for folding individual multi-sheet products along a folding line, particularly for applying a further longitudinal fold to newspapers having an existing fold running transversely to said fold line, comprising:
at least one pressure element effective at the inside of the fold to be formed;
said pressure element having a pair of substantially linear and parallel pressure edges with a gap therebetween;
a pair of rotatable contact drums having a gap therebetween and being positioned at the outside of the fold to be formed; and
means for displacing said pressure element into the gap between the contact drums to thereby product simultaneously a bend in a portion of the sheets located at the inside of the fold to be formed, such bend having a curvature opposite to the fold to be formed and the fold itself.

16. The apparatus as defined in claim 15, wherein:
said pressure edges are formed at an edge of a substantially plate-shaped element.

17. The apparatus as defined in claim 16, wherein:
said plate-shaped element has an end portion which possesses a hollow channel separating both pressure edges from one another.

* * * * *